United States Patent
Crafts et al.

(10) Patent No.: US 7,852,475 B2
(45) Date of Patent: Dec. 14, 2010

(54) SCANNING SPECTROMETER WITH MULTIPLE PHOTODETECTORS

(75) Inventors: Douglas E. Crafts, Los Gatos, CA (US); Jinxi Shen, San Ramon, CA (US); Philip Duggan, Ottawa (CA); James F. Farrell, San Jose, CA (US); Barthelemy Fondeur, San Jose, CA (US); Eliseo Ranalli, Irvine, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 298 days.

(21) Appl. No.: 12/189,993

(22) Filed: Aug. 12, 2008

(65) Prior Publication Data

US 2009/0046288 A1     Feb. 19, 2009

Related U.S. Application Data

(60) Provisional application No. 60/955,455, filed on Aug. 13, 2007.

(51) Int. Cl.
*G01J 3/28*     (2006.01)

(52) U.S. Cl. ...................................................... 356/328
(58) Field of Classification Search .................. None
See application file for complete search history.

(56) References Cited

U.S. PATENT DOCUMENTS

| | | | |
|---|---|---|---|
| 5,617,234 A | 4/1997 | Koga et al. ..................... 398/14 |
| 6,118,530 A | 9/2000 | Bouevitch et al. ........... 356/308 |
| 6,657,186 B2 * | 12/2003 | Graves ................... 250/227.23 |
| 6,753,958 B2 | 6/2004 | Berolo et al. ............... 356/328 |
| 7,035,505 B2 | 4/2006 | Shen et al. ..................... 385/24 |
| 7,130,505 B2 * | 10/2006 | Shen ............................ 385/24 |

* cited by examiner

*Primary Examiner*—Tu T Nguyen
(74) *Attorney, Agent, or Firm*—Matthew A. Pequignot; Pequignot + Myers LLC

(57) ABSTRACT

A scanning optical spectrometer with a detector array is disclosed, in which position of focused spot of light at the input of a dispersive element such as arrayed waveguide grating (AWG) with a slab input, is scanned using a micro-electro-mechanical (MEMS) tiltable micromirror so as to make the dispersed spectrum of light scan over the detector array coupled to the AWG. Sub-spectra recorded using individual detectors are concatenated by a processor unit to obtain the spectrum of input light.

24 Claims, 8 Drawing Sheets

SCANNING SPECTROMETER WITH MULTIPLE PHOTODETECTORS

CROSS-REFERENCE TO RELATED APPLICATIONS

The present invention claims priority from U.S. patent application Ser. No. 60/955,455 filed Aug. 13, 2007, entitled "Scanning MEMS and grating based optical performance monitor", by Crafts et al., which is incorporated herein by reference for all purposes.

TECHNICAL FIELD

The present invention is related to spectrometers, and in particular to optical performance monitors in a fiberoptic network.

BACKGROUND OF THE INVENTION

A spectrometer is an apparatus for measuring a spectrum of electromagnetic radiation such as light. Spectrometers are widely used in science and industry as powerful analytical and measurement tools. For example, they are used for remote sensing of temperature, determining chemical composition and concentration of chemical compounds, and identifying substances.

Spectrometers for measuring optical power as a function of wavelength are called optical spectrum analyzers (OSAs). Most conventional OSAs use a wavelength tunable optical filter, such as a Fabry-Perot interferometer or a diffraction grating, to resolve the individual spectral components. In the latter case, light is reflected off the diffraction grating at an angle dependent on the wavelength. The spectrum of light is then analyzed on the basis of the angle at which the light is diffracted using a detector array. Alternatively, the diffracted light is moved over a slit and then detected using a photodetector.

Traditional OSAs are manufactured as laboratory devices, which operate under laboratory environmental conditions. A sophisticated wavelength and optical power calibration is required from time to time to ensure the wavelength and power accuracy of the devices. Furthermore, they are generally bulky as well as costly.

Optical communication systems employing wavelength division multiplexing (WDM) technology achieve large transmission capacity by spacing optical channels as closely as possible, typically less than a nanometer (nm) apart. As the channel spacing decreases, monitoring spectral characteristics of the channels becomes more critical in verifying system functionality, identifying performance drift, and isolating system faults. For example, such monitoring is critical in detecting wavelength drift, which can readily cause signals from one optical channel to cross one into another. Also, real-time feedback to network elements is critical to ensure stable operation of optical amplifiers commonly employed in the network.

Optical communication systems require industrial grade optical performance monitors (OPMs), which function similarly to the traditional OSA, but are, however, subject to stringent industrial requirements. They must be relatively inexpensive, compact in size, with the reporting power and wavelength accuracy nearly the same as laboratory grade OSA, however without requiring extra calibration during the lifetime of the device, and be capable of monitoring light at densely spaced frequency points with high spectral resolution and high dynamic range. An OPM usually outputs a spectrum as a function of optical frequency rather than wavelength, because the standardized spectral grid of optical channels, the so-called ITU grid, is equidistant in frequency rather than the wavelength units.

It is advantageous to have an OPM capable of monitoring all channels in one optical band of an optical communication link. It is also advantageous to have an additional functionality of monitoring an optical to signal noise ratio (OSNR) for each channel, which requires monitoring not only individual channels, but also light between channels to estimate an optical noise level, thereby further increasing spectral resolution requirements for an OPM. Today's WDM networks may employ as many as 200 channels with 25 GHz spacing between the channels in one optical communication band of approximately 5000 GHz; these networks would benefit from an OPM capable of monitoring at lest 200 frequency channels with 25 GHz spacing. Such an OPM could also be advantageously used in communication systems having 200 GHz, 100 GHz, and 50 GHz spaced channels by providing an OSNR monitoring capability.

One type of industrial-grade OPM acquires the spectrum by angle-tuning a dispersive element such as diffraction grating. For example, U.S. Pat. No. 6,118,530 by Bouevitch et al. assigned to JDSU corporation, which is incorporated herein by reference, teaches a scanning frictionless spectrometer with magnetically actuated flexure-supported diffraction grating and a dedicated separate channel for accurate wavelength referencing during each scan. The advantage of the scanning approach of Bouevitch et al. is based on the ability to continuously sweep the wavelength across the entire spectral region, which greatly improves fidelity of spectra obtained, as well as accuracy of OSNR and peak wavelengths determination. Detrimentally, a scanning spectrometer is often slower than its detector array based counterpart. A slower measurement speed results from the fact that, in a conventional scanning spectrometer, most of incoming light is discarded, and only a narrow optical frequency component is allowed to impinge on a photodetector at any given time. Moreover, having to rotate a relatively large optical element such as diffraction grating reduces overall reliability and expected lifetime of a conventional scanning OPM.

Another type of industrial-grade OPM acquires all monitored spectral points of an optical spectrum of an input signal in parallel by dispersing the input light in space and using a plurality of photodetectors, e.g. a photodiode array (PDA), to simultaneously acquire spectral information at a plurality of monitored frequencies; a bulk grating, a blazed fiber Bragg grating, a waveguide echelle grating or an array waveguide grating (AWG) can be used as a dispersive element.

Disadvantageously, the number of photodiodes in the PDA scales proportionally to the required wavelength resolution, thereby increasing the size and cost of the device and reducing its reliability. If the OSNR of each channel is to be measured, several photodetectors have to be provided within the dispersed light of a single channel. Thus, a four channel optical monitor typically requires at least 12 photodiodes. Since current photodiode arrays are often supplied in strips of up to 128 photodiodes, this allows monitoring of just over 30 channels.

U.S. Pat. No. 5,617,234 issued Apr. 1, 1997 in the name of Koga et al., which is incorporated herein by reference, discloses a multi-wavelength simultaneous monitoring circuit capable of precise discrimination of wavelengths of a WDM signal, and suitable for optical integrated circuits. The device proposed by Koga is an arrayed waveguide grating (AWG) that has a single input port and multiple output ports and has photodetectors coupled to the output ports of the AWG.

Koga's device requires an AWG having a number of output ports equal to a number of monitoring channels with frequency resolution better than spacing between the channels, and a number of costly photodetectors equal to the number of channels to be monitored, without providing an OSNR measurement capability.

Recently, attempts have been made to provide a solution to the problem of scaling by combining the aforedescribed sequential and parallel acquisition approaches in a way wherein the size, the design complexity, e.g. the number of photosensitive elements, and the control complexity of the monitor scale sub-linearly with a number of monitored wavelengths within a monitored range of wavelengths.

For example, U.S. Pat. No. 6,753,958 in the names of Berolo et al., which is incorporated herein by reference, discloses an approach to monitoring a large number of wavelengths with a relatively small number of photodiodes without dynamically tuning wavelength-selective elements that may require complex real-time monitoring and control. Berolo et al. teach an OPM that has an optical input port coupled through a switch to a plurality of input waveguides, which are sequentially switched to provide light received from the input port via one of the input waveguides to a waveguide echelle grating, which disperses the light toward a plurality of photodetectors. The echelle grating disperses light received from an input waveguide in dependence upon the input waveguide position, so that light picked up by the photodetectors has different centre wavelengths depending on via which of the input waveguides the light entered the grating. By arranging the input waveguides so that the centre wavelengths sampled by photodiodes shift by a fraction of the channel spacing of the WDM signal when the light is switched between adjacent input waveguides, the WDM signal carried by the light can be sampled with a frequency period equal to the fraction of the channel spacing. Disadvantageously, when the optical channel density is increased, the crosstalk between the input waveguides effectively limits amount of data points available.

Further, U.S. Pat. Nos. 7,035,505 and 7,130,505 by Shen et al. assigned to JDSU corporation, which are incorporated herein by reference, disclose an optical performance monitor based on a demultiplexing arrayed waveguide grating (AWG) having a plurality of Vernier input waveguides disposed between an optical switch and a photodiode array coupled to the output waveguides of the AWG. A specific position pattern of M input waveguides having a frequency spacing different from the frequency spacing of the N output waveguides in a manner similar to a well-known Vernier scale, e.g. a scale in Vernier calipers, serves to provide a possibility to measure a spectrum at up to M×N frequency points. Detrimentally, the approach of Shen et al., due to Vernier geometry, produces a set of folded spectra and therefore requires computation-intensive spectral unfolding processing. Further, for both approaches of Berolo et al. and Shen et al., an external waveguide-coupled optical switch is required which complicates the design and increases optical losses.

It is an object of the present invention to provide a spectrometer combining the advantages of both scanning and detector array-based approaches. The spectrometer of the present invention provides a high-fidelity, scanned optical spectrum, with a number of measurement points not limited by the apparatus geometry. Further, advantageously, the spectrometer of the present invention uses parallel detection, with much less light being discarded for spectral selectivity than in a prior-art scanning approach described above. Yet further, advantageously, the spectrometer of the present invention allows for multiple selectable input ports without an associated increase in complexity, e.g. without having to incorporate an additional switch at the input, which leads to significant cost savings for a system requiring multiport spectral measurements.

SUMMARY OF THE INVENTION

In accordance with the invention there is provided a spectrometer for measuring a spectrum of light having a frequency range $\Delta f$, the spectrometer comprising:

M input ports $P_m$ for receiving light and relaying the light to M source points $S_m$, wherein $M \geq 1$; and m is an integer number satisfying the following condition: $1 \leq m \leq M$;

an input scanning means coupled to the M input ports $P_m$, for relaying the light from any of the M source points $S_m$ to an intermediate point, wherein in operation, a location x of the intermediate point is scanned by the scanning means from a value $x_1$ continuously to a value $x_2$ within a scanning range $\delta x = |x_2 - x_1|$;

a dispersing means coupled to the input scanning means, for spatially separating frequency components of light in dependence upon the location x of the intermediate point of light;

N detectors $D_n$ coupled to the dispersing means, for detecting the light in dependence upon the optical frequency thereof, wherein $N \geq 2$; n is an integer number satisfying the following condition: $2 \leq n \leq N$; and each detector $D_n$ is disposed to receive the optical frequency component at a central frequency $f_n(x)$, so that, when x is scanned between values $x_2$ and $x_1$, the central frequency $f_n(x)$ is scanned within a range $\delta f = |f_n(x_2) - f_n(x_1)|$;

wherein, for any central frequency $f_0$ within the range $\Delta f$ of optical frequencies, there is at least one such $n = n_0$ and at least one such $x = x_0$ that $f_{n0}(x_0) = f_0$.

In accordance with another aspect of the invention there is further provided an optical performance monitor for measuring optical power, or central wavelength, or optical signal-to-noise ratio of optical signals in a fiberoptic network, the monitor comprising:

an input waveguide for emitting a light containing the optical signals;

an arrayed waveguide (AWG) demultiplexor for separating the light into optical frequency components, the AWG demultiplexor having: an input slab, an array of grating waveguides coupled to the input slab, an output slab coupled to the array of the grating waveguides, and a star coupler coupled to the output slab; wherein the star coupler has a plurality of output waveguides, wherein each of said output waveguides is coupled to a photodiode for producing an electrical signal in response to a light impinging thereon;

a coupler for coupling the light emitted by the input waveguide to a tiltable micro-electro-mechanical (MEMS) mirror having an angle of tilt, and for free-space coupling the light reflected from the MEMS mirror to the input slab of the AWG demultiplexor, at a location defined by said angle of tilt; and a controller, for continuously scanning the angle of tilt of the MEMS mirror during a cycle of scanning, and for collecting the electrical signals from the photodiodes during the cycle of scanning, and for combining said signals so as to obtain the optical power, or the central wavelength, or the optical signal-to-noise ratio of the optical signals in the fiberoptic network.

In accordance with yet another aspect of the invention there is further provided a method of measuring a spectrum of light having a frequency range $\Delta f$, the method comprising:

receiving the light at any of M source points $S_m$, wherein $M \geq 1$; and m is an integer number satisfying the following condition: $1 \leq m \leq M$;

relaying the light from any of the M source points $S_m$ to an intermediate point at a location x;

scanning the location x of the intermediate point from a location $x_1$ continuously to a location $x_2$ within a scanning range $\delta x = |x_2 - x_1|$;

spatially separating frequency components of light in dependence upon the location x of the intermediate point of light;

detecting the frequency components of light using N detectors $D_n$, wherein $N \geq 2$; n is an integer number satisfying the following condition: $2 \leq n \leq N$; wherein each detector $D_n$ is disposed to receive the optical frequency component at a central frequency $f_n(x)$, so that, when x is scanned between values $x_1$ and $x_2$, the central frequency $f_n(x)$ is scanned within a range $\delta f = |f_n(x_2) - f_n(x_1)|$;

wherein, for any central frequency $f_0$ within the range $\Delta f$ of frequencies of light, there is at least one such $n = n_0$ and at least one such $x = x_0$ that $f_{n0}(x_0) = f_0$; and collecting signals from the N detectors $D_n$ during the scanning of the scanning means within the scanning range $\delta x = |x_2 - x_1|$, and combining said signals within respective frequency ranges $\delta f = |f_n(x_2) - f_n(x_1)|$, so as to obtain the spectrum of light within the frequency range $\Delta f$.

BRIEF DESCRIPTION OF THE DRAWINGS

Exemplary embodiments will now be described in conjunction with the drawings in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 1A:
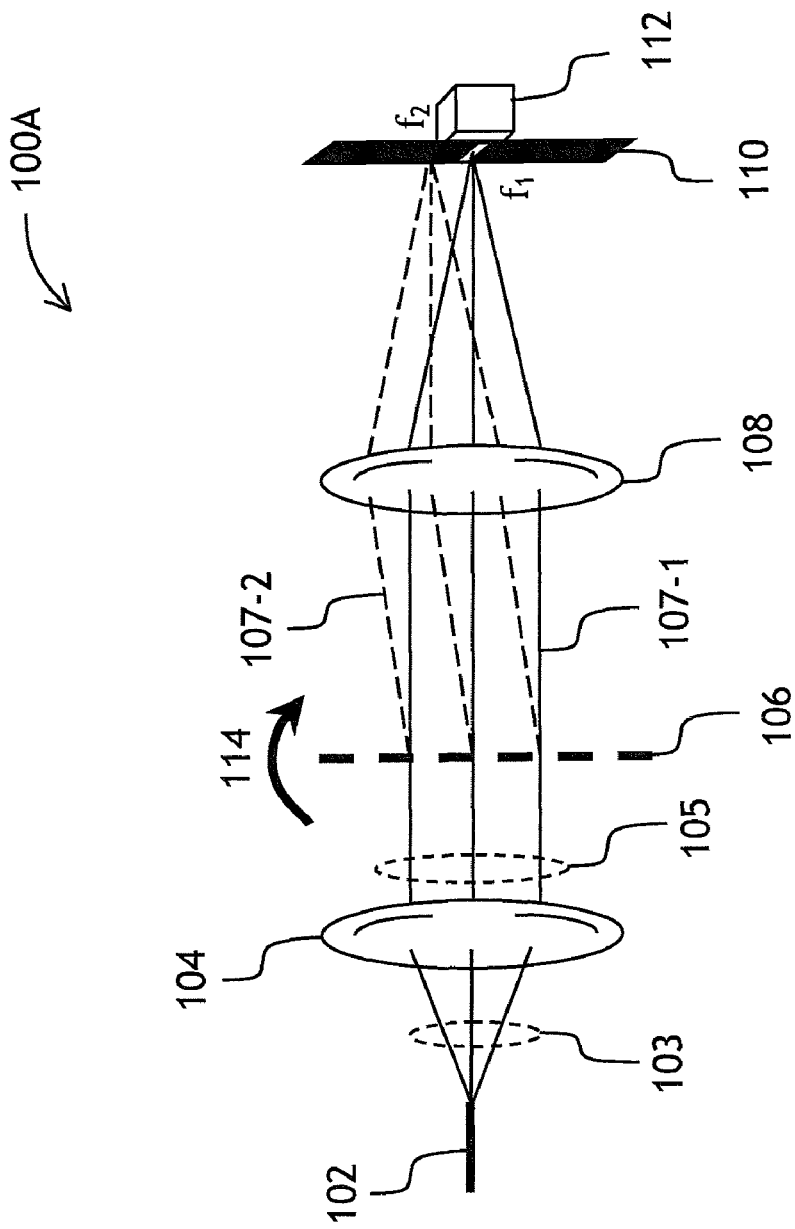
FIGS. 1A and 1B are views of a conventional scanning spectrometer and a detector array spectrometer, respectively.

Referring to FIG. 1A, a view of a conventional scanning spectrometer 100A is shown comprising an input port 102, a collimating lens 104, a diffraction grating 106, a focusing lens 108, a slit 110, and a detector 112. The input port 102 representing an input slit or an input waveguide defines the starting point of a diverging light beam 103, which is collimated by collimating lens 104 to produce a collimated beam 105. The beam 105 impinges onto diffraction grating 106, which disperses the beam into a fan of individual monochromatic beams. For example, a beam 107-1 at an optical frequency $f_1$ propagates to the lens 108 straight, and a beam 107-2 at an optical frequency $f_2$ propagates to same lens 108 at an angle as shown in FIG. 1A. Lens 108 focuses the beams 107-1 and 107-2 onto a focal plane coinciding with the plane of slit 110. The beam at optical frequency $f_1$ passes through slit 110 and produces a photocurrent in detector 112, while the beam at optical frequency $f_2$ is blocked by slit 110. After the diffraction grating 106 is rotated as shown with an arrow 114, the beam at optical frequency $f_2$ will pass through the slit 110.

Figure 1B:
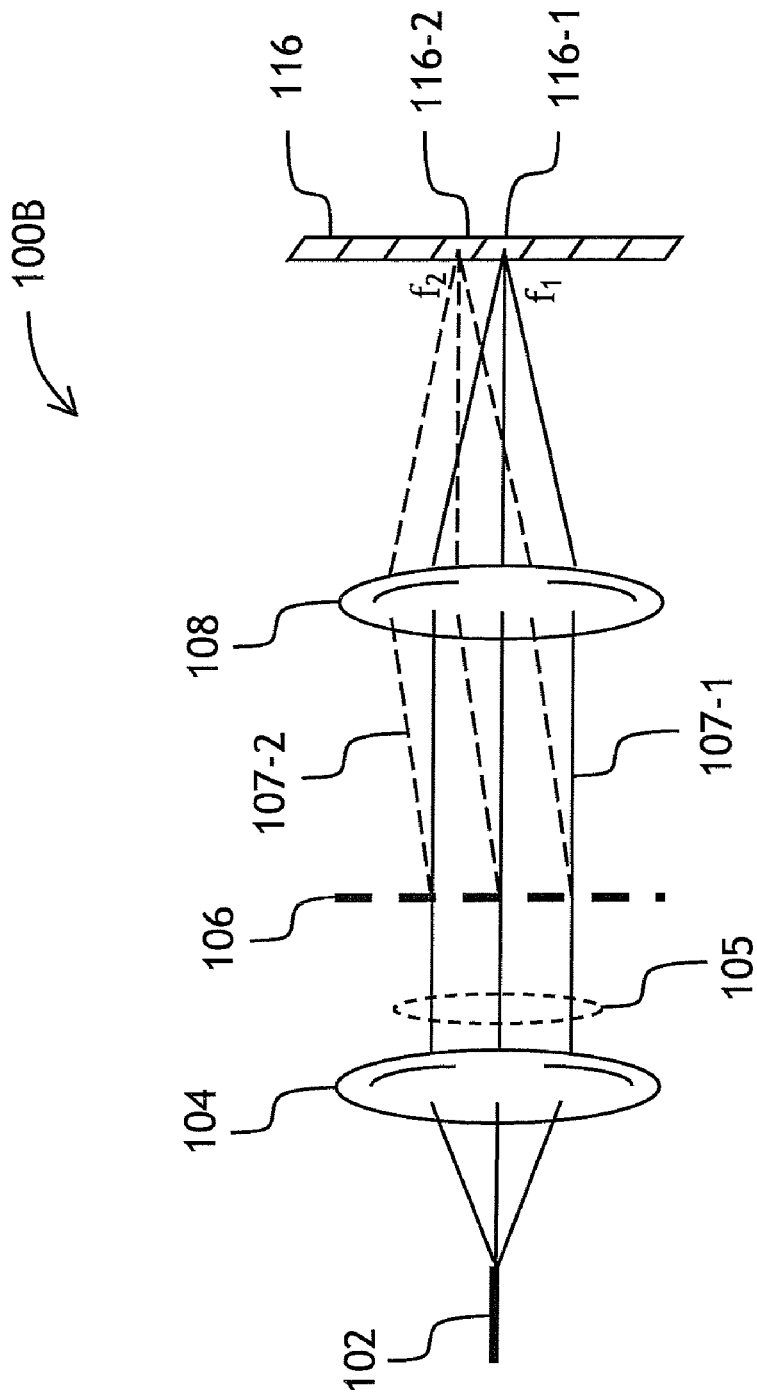

Turning now to FIG. 1B, a view of a conventional detector-array spectrometer 100B is shown. The spectrometer 100B of FIG. 1B is comprised of the same parts as the spectrometer 100A of FIG. 1A with the exception that the slit 110 and single detector 112 of FIG. 1A are replaced by a detector array 116 of FIG. 1B. Another important difference of spectrometer 100B of FIG. 1B from the spectrometer 100A of FIG. 1A is that, in spectrometer 100B of FIG. 1B, diffraction grating 106 is not rotated; instead, beams at both optical frequencies $f_1$ and $f_2$ are detected simultaneously by different detectors of detector array 106, a detector 116-1 and a detector 116-2, respectively. Because the beams at different optical frequencies are detected simultaneously by different detectors of the detector array 116, the data acquisition speed is much higher than that of the scanning spectrometer 100A of FIG. 1A. Detrimentally, the amount of spectral points of the spectrometer 100B of FIG. 1B is limited to the amount of individual detectors in detector array 116.

Figure 2:
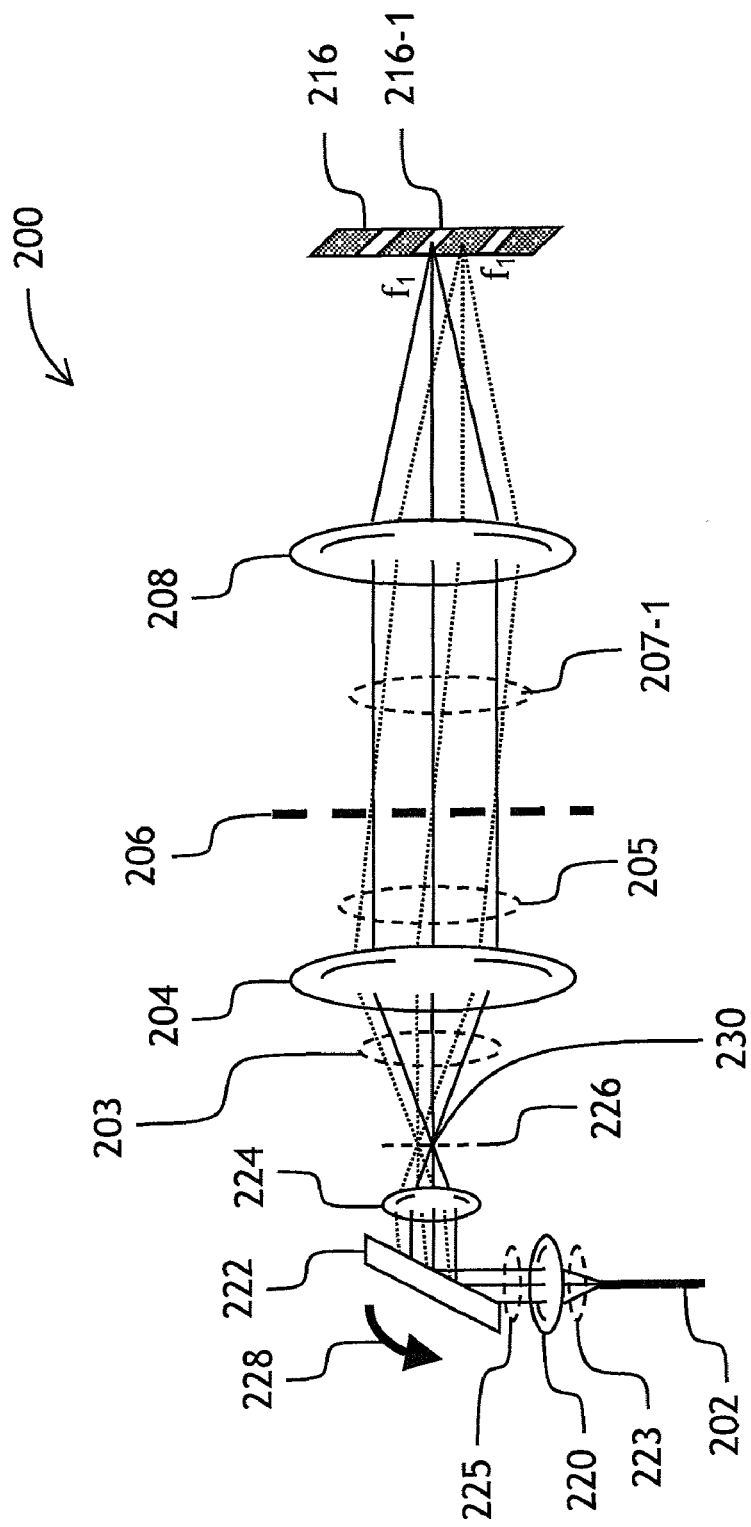
FIG. 2 is a view of a spectrometer of the present invention.

Turning now to FIG. 2, a spectrometer 200 of the present invention is shown comprising an input port 202, a first collimating means 220, a scanning mirror 222, a first focusing means 224, a second collimating means 204, a dispersing means 206, a second focusing means 208, and a detector array 216. Preferably, input port 202 is an input optical fiber, scanning mirror 222 is a micro-electro-mechanical (MEMS) mirror, and dispersing means 206 is a diffraction grating. In operation, input port 202 emits a diverging beam of light 223, which is collimated by first collimating means 220 to produce a collimated beam 225 impinging on scanning mirror 222. A reflected beam is focused by first focusing means 224 in an intermediate focal plane 226 so that, as scanning mirror 222 is turned as shown by an arrow 228, an intermediate focal point 230 shifts upwards in FIG. 2 in intermediate focal plane 226. After passing intermediate focal plane 226, a diverging beam 203 is collimated by second collimating means 204 so as to produce a collimated beam 205 impinging onto dispersing means 206. The dispersing means 206 re-directs the beam 205 in a dependence upon its optical frequency. For simplicity, only one beam 207-1 at a frequency component $f_1$ is shown in FIG. 2. The beam 207-1 is focused onto a detector array 216. As scanning mirror 222 is continuously tilted, or scanned as shown by an arrow 228, the beams 203, 205, and 207-1 are shifted as illustrated by dotted lines in FIG. 2, so as to shift a focused spot of a beam at optical frequency $f_1$ across a detector 216-1 of detector array 216. Beams at other optical frequencies, not shown, are scanned across respective detectors of detector array 216. As scanning mirror 222 is scanned, each detector of detector array 216 will see a sub-set of the optical frequency spectrum of an incoming optical signal. These optical frequency spectrum sub-sets, when combined, result in the total optical spectrum of the signal being measured by spectrometer 200. Preferably, the spectral range of the sub-set is equal to total spectral range to be covered divided by the amount of detectors in detector array 216.

The collimating and, or focusing means 220, 224, 204, and 208 are shown in FIG. 2 as lenses, which is done for the sake of convenience of explanation of the principle of operation of spectrometer 200. Other elements having optical power, for example concave mirrors can be used as focusing means 220, 224, 204, and 208; moreover, the means 220 and 224 can be combined into a single double-passed optical element; similarly, the means 204 and 208 can be combined, to increase the compactness and to reduce cost of the device. Further, it is understood that the means 204, 206, and 208 can be replaced by a single element, such as a concave diffraction grating.

Figure 3A:
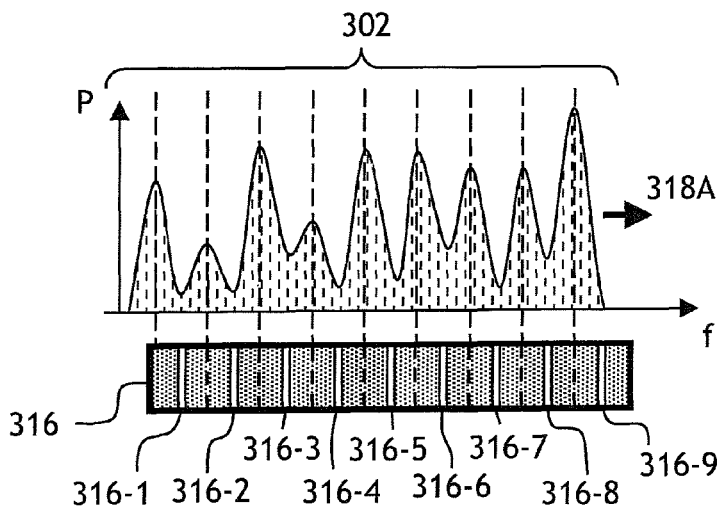
FIGS. 3A, 3B, and 3C represent an optical spectrum correlated to a plan view of a detector array of a spectrometer of FIG. 2.
Figure 3B:
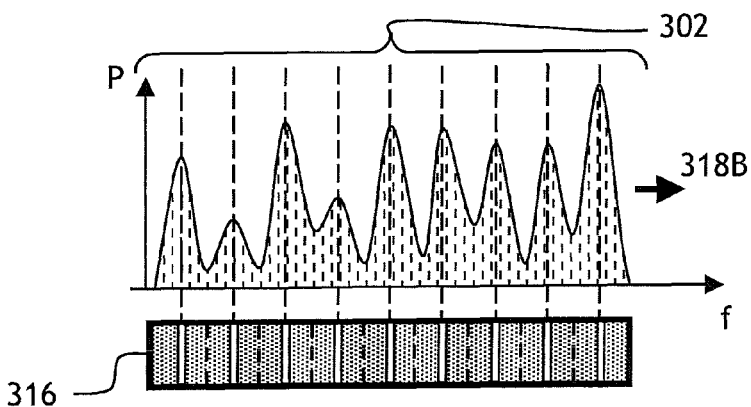
Figure 3C:
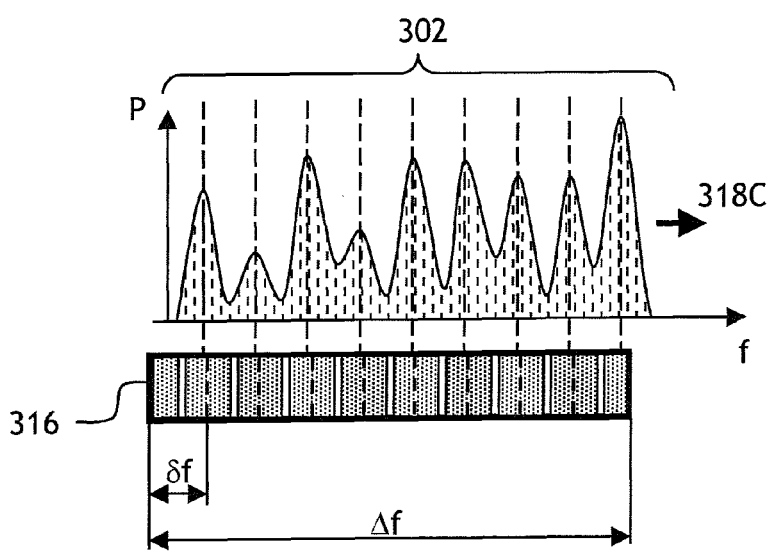

Referring now to FIGS. 3A-3C, the data collection principle of spectrometer 200 of FIG. 2 is further illustrated. In FIGS. 3A-3C, a detector array 316 corresponds to detector array 216 of FIG. 2. A spectrum 302 is a distribution of optical power density P of light dispersed in optical frequency f in a plane of detector array 316. As the mirror 222 of FIG. 2 is scanned, spectrum 302 is moved, as shown by an arrows 318A-318C, across detectors 316-1-316-9 of detector array 316. In FIG. 3B, for example, the peaks of the spectrum 302 overlap with individual detectors of detector array 316. In FIG. 3C, these peaks are shifted to the right from corresponding individual detectors. The full scanning sub-range, δf, is related to the total spectral range Δf of spectrum 302 as follows:

$$\delta f = \Delta f / N, \quad (1)$$

where N is the total amount of detectors in detector array 316. In FIGS. 3A-3C, N=9.

Alternatively, the full scanning sub-range δf can be made slightly larger than Δf/N, to allow for an overscan, so as to ease the task of "stitching" the spectra obtained from individual detectors of detector array 316. The condition of overscan is expressed as $$\delta f > \Delta f / N, \quad (2)$$

The spectrometer 200 of FIG. 2 inherits the advantages of both spectrometers 100A of FIG. 1A and 100B of FIG. 1B, without sharing most of their common drawbacks. Indeed, spectrometer 200 produces a scanned spectrum, having high fidelity and improved accuracy of peak frequencies determination, without having to discard most of the frequency dispersed light. In fact, spectrometer 200 of FIG. 2 is approximately N times more efficient in signal utilization than spectrometer 100A of FIG. 1A. Advantageously, in case of application of spectrometer 200 as an optical performance monitor (OPM), the sub-ranges δf are chosen to equal a channel frequency spacing in an optical communications network, e.g. 100 GHz, the centers of scanning sub-ranges δf corresponding to optical frequencies of ITU grid. Further, advantageously, the requirements for the scanning mechanics of spectrometer 200 are greatly relaxed due to the fact that, first, the scanning mirror 222 of FIG. 2 can be made much smaller and lighter than dispersing means 206, and second, the scanning angle can be made small enough so that a suitable technology, such as MEMS tilted micro-mirror technology, can be used, which greatly improves overall reliability of scanning spectrometer 200. Yet further, advantageously, a planar arrayed waveguide grating (AWG) demultiplexor can be used in place of second collimating means 204, dispersing means 206, and second focusing means 208, as will be shown below.

Figure 4:
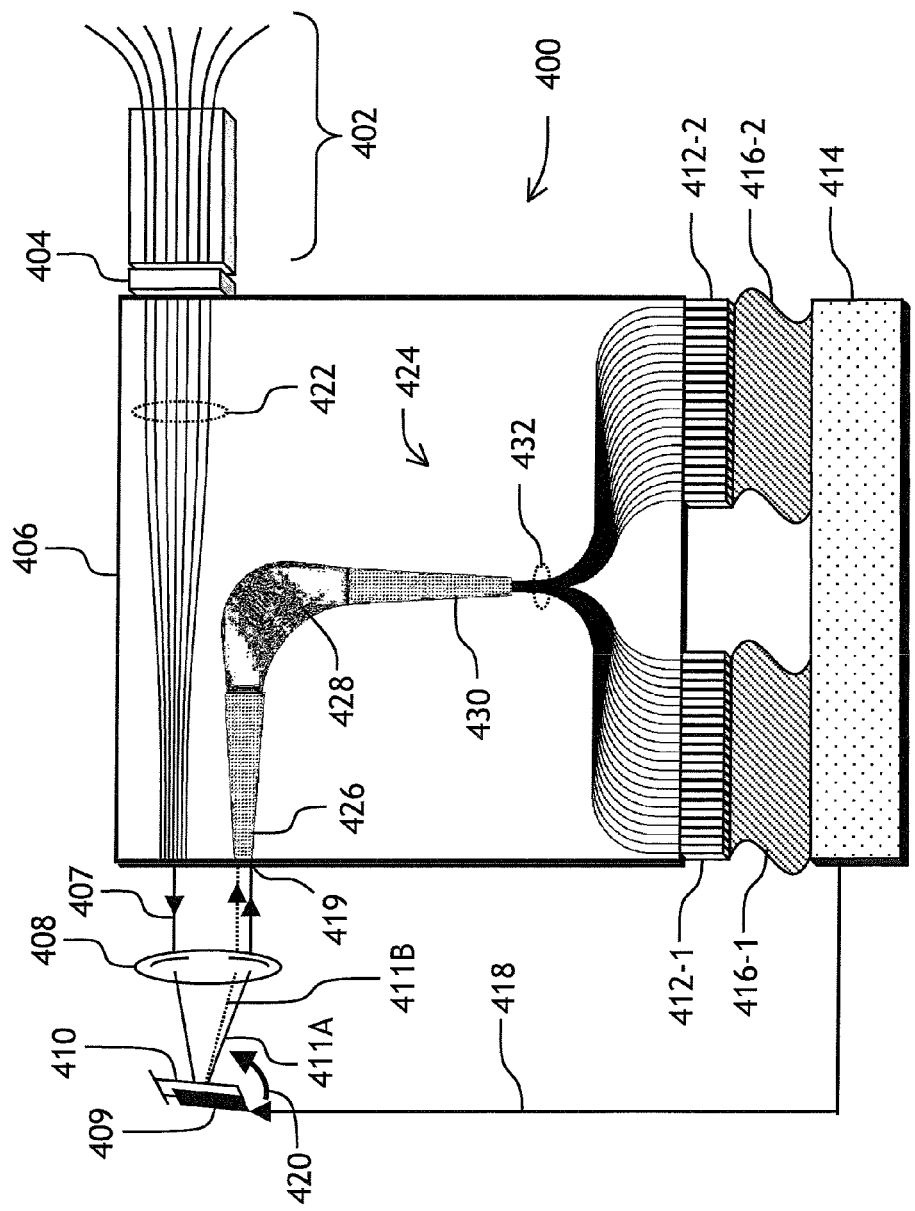
FIG. 4 is a plan view of a preferred embodiment of an optical performance monitor (OPM) of the present invention, wherein the OPM is based on a tiltable micro-electro-mechanical (MEMS) micromirror and arrayed waveguide grating (AWG) demultiplexor.

Turning now to FIG. 4, another preferred embodiment of the spectrometer of the present invention is illustrated. A spectrometer 400 comprises an input fiber array 402 for providing a plurality of input ports, a microlens array 404 optically coupled to fiber array 402 for coupling light from its individual fibers into a planar lightwave circuit (PLC) 406, a lens 408 for coupling light from PLC 406 to a MEMS mirror 410 and back to PLC 406, two photodiode arrays 412-1 and 412-2 coupled to PLC 406, wherein said photodiode arrays 412-1 and 412-2 provide electrical input to a controller 414 via ribbons 416-1 and 416-2, respectively. Controller 414 is connected to a MEMS actuator 409 by a line 418. MEMS actuator 409 tilts MEMS mirror 410 in response to a voltage applied by controller 414 through line 418 to MEMS actuator 409. PLC 406 comprises an array of input waveguides 422 optically coupled, one-to-one, to plurality of fibers of the input fiber array 402 through microlens array 404, and an AWG demultiplexor 424 having an input slab 426, a waveguide array 428, an output slab 430, and a plurality of output waveguides 432 optically coupled to detector arrays 412-1 and 412-2. In operation, a light the spectrum of which is to be measured is fed through one of fibers of input fiber array 402 and is coupled into a respective input waveguide of the input waveguide array 422. Lens 408 collimates an output beam 407 emitted by the waveguide of the input waveguide array 422 and directs it towards MEMS mirror 410 which reflects the beam at an angle which is dependent upon a voltage applied to MEMS actuator 409. Out of all possible beam paths, two paths 411A and 411B of the reflected beam are shown in FIG. 4. The paths 411A and 411B are shown with a solid and a dotted line, respectively. Optical beams propagating along these paths are coupled into slab waveguide 426 of AWG demultiplexor 424, and said demultiplexor separates the beams into individual frequency components propagating each in a respective waveguide of output waveguide array 432. At the output of the array 432, the beams impinge on respective photodiodes generating a photocurrent in dependence on optical power levels at said photodiodes. The photocurrents are recorded by controller 414. The controller 414 sweeps a voltage applied to MEMS actuator 409 through line 418, so as to tilt MEMS mirror 410 as shown by an arrow 420 and make the reflected optical beam sweep from path 411A towards path 411B. As the beam sweeps, a launch point 419 of light into slab 426 shifts upwards in FIG. 4, which effectively sweeps the central optical frequencies of light coupled into output waveguides 432 and impinging on photodiodes of photodiode arrays 412-1 and 412-2. A thermal sensor, not shown, can be used to measure the temperature of PLC 406 and compensate for a wavelength drift of AWG demultiplexor 424.

Figure 5A:
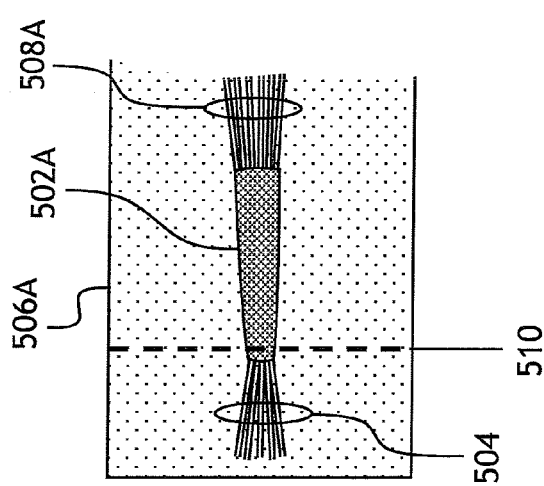
FIGS. 5A and 5B are plan views of an input slabs of an AWG demultiplexor.
Figure 5B:
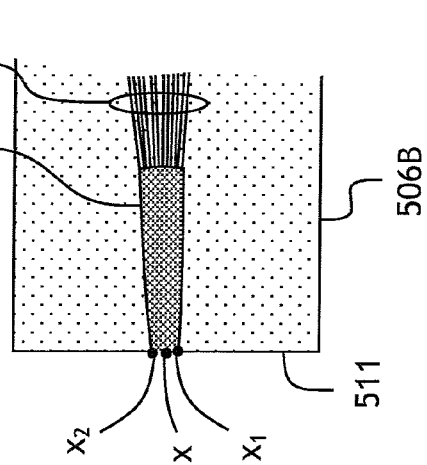

Turning now to FIGS. 5A and 5B, a geometry of input slab 426 of FIG. 4 is further illustrated by means of plan views of two input slabs, slab 502A of FIG. 5A and slab 502B of FIG. 5B. In FIG. 5A, a substrate 506A supports slab 502A and a plurality of input waveguides 504 coupled to slab 502A, and a plurality of output waveguides 508A coupled to said slab from the opposite side. In FIG. 5B, a substrate 506B supports slab 502B and a plurality of output waveguides 508B. Instead of waveguide on the input side, the slab is open for coupling light from the outside of the substrate. For example and for the purpose of illustration, by cutting substrate 506A along a dashed line 510, one can obtain slab 502B of FIG. 5B from slab 502A of FIG. 5A. The advantage of slab 502B of FIG. 5B is that a light can be coupled into slab 502B along a side 511 of substrate 506B at any point x of a straight line connecting points $x_1$ and $x_2$ in FIG. 5B, whereas in slab 502A of FIG. 5A, the location of the point of coupling of light into slab 501A is pre-determined by locations of the right ends of input waveguides 504 of FIG. 5A. Additionally and advantageously, optical coupling tolerances into slab 502B along the line connecting points $x_1$ and $x_2$ are greatly reduced which results in more reproducible and uniform insertion loss for light coupled into slab 502B along said line. Further, advantageously, the input slab geometry of FIG. 5B allows for scanning of the location x of the intermediate point of light, which effectively sweeps the central wavelengths of the output waveguides of the AWG demultiplexor 424 of FIG. 4.

Scanning the intermediate point x of FIG. 5B of entrance of light into a slab waveguide using a tiltable MEMS mirror such as MEMS mirror 410 of FIG. 4 has another important advantage, specifically it allows one to incorporate multiple input ports in the spectrometer of the present invention without having to introduce an additional optical switch.

Figure 6:
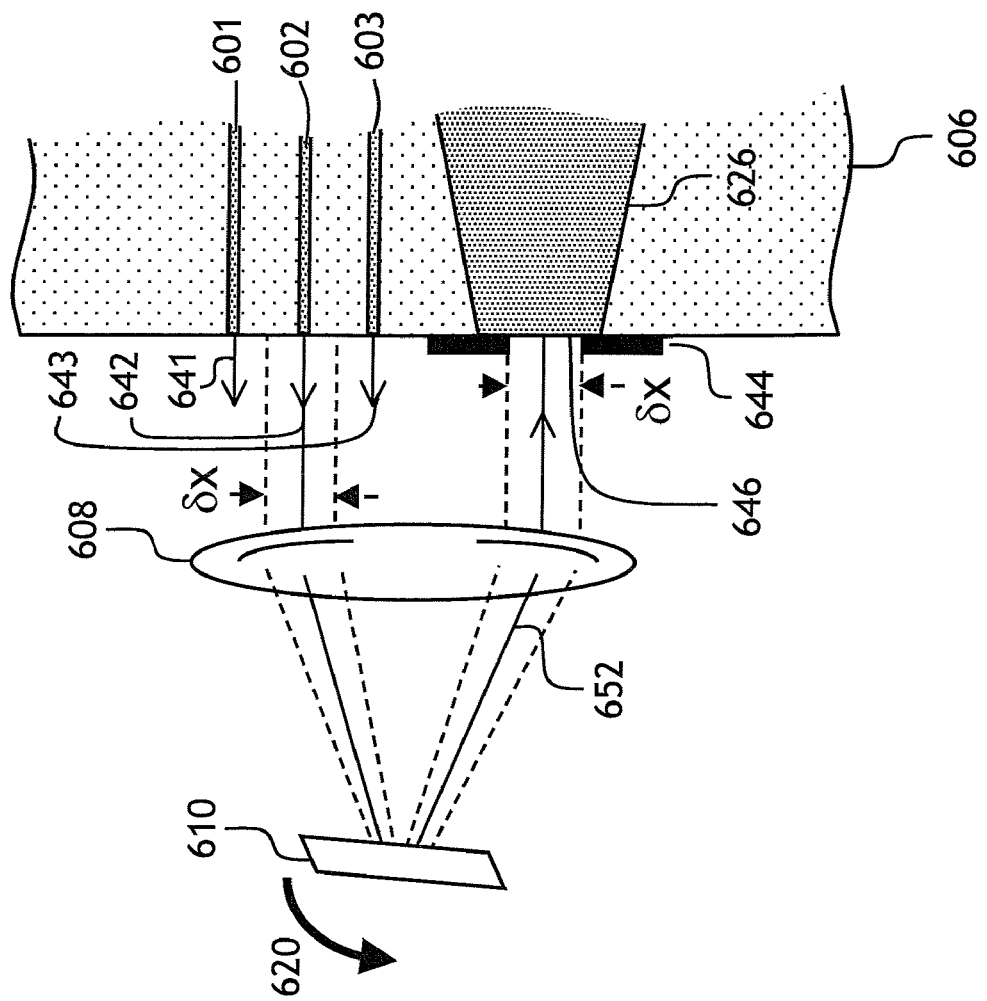
FIG. 6 is a zoom-in view showing a mask applied to an input slab of the AWG.

Turning now to FIG. 6, an enlarged view of spectrometer 400 of FIG. 4 is presented. Three input waveguides 601, 602, and 603 of FIG. 6 emit light beams simultaneously as shown by arrows 641, 642, and 643, respectively. A lens 608 collimates the beams and directs them towards a MEMS mirror 610. Location of lens 608, angles of waveguides 601, 602, and 603, and location of MEMS mirror 610 are chosen so that the three beams represented by arrows 641, 642, and 643 overlap at MEMS mirror 610. For example, when waveguides 601, 602, and 603 are parallel to each other, lens 608 should be placed one focal length away from input facet 646 of slab 626, and MEMS mirror 610 should be placed one focal length away from lens 608. Upon reflection off MEMS mirror 610, a beam 652 is focused at an input facet 646 of an input slab 626. During normal operation of the spectrometer, a tilt angle of MEMS mirror 610 is scanned as shown by an arrow 620. In order to prevent light emitted by waveguides 601 and 603 from entering slab 626 during the scanning, a mask 644 is applied to the input facet 646. The width δx of mask 646 is chosen to be less than a distance between waveguides 601 and 602, and a distance between waveguides 602 and 603. By comparing position of waveguides 601, 602, and 603 with position of dashed lines in FIG. 6, one can see that, for as long as beam 652 is coupled into slab 626, beams from waveguides 601 and 603 cannot enter said slab 626. However, by tilting MEMS mirror 610 at a different angle, it is possible to couple the beam represented by arrow 641 into slab 626. Due to presence of mask 644, only a beam from one of the input waveguides 601, 602, or 603 may enter slab 626. Thus, the same mirror 610 used for scanning the spectrum, can be used, when tilted at a larger angle than the angle corresponding to scanning, to switch between a plurality of input waveguides 601, 602, and 603. In order to lessen a magnitude of a tilt angle of MEMS mirror 610 required to switch input waveguides 601, 602, and 603, and also in order to reduce optical aberrations induced by lens 608, the input waveguides 601, 602, and 603 are fanned in from a pitch of a fiber array of, for example, 250 microns at a fiber array side, to a value of between 20 and 40 microns at a MEMS side shown in FIG. 6.

Figure 7:
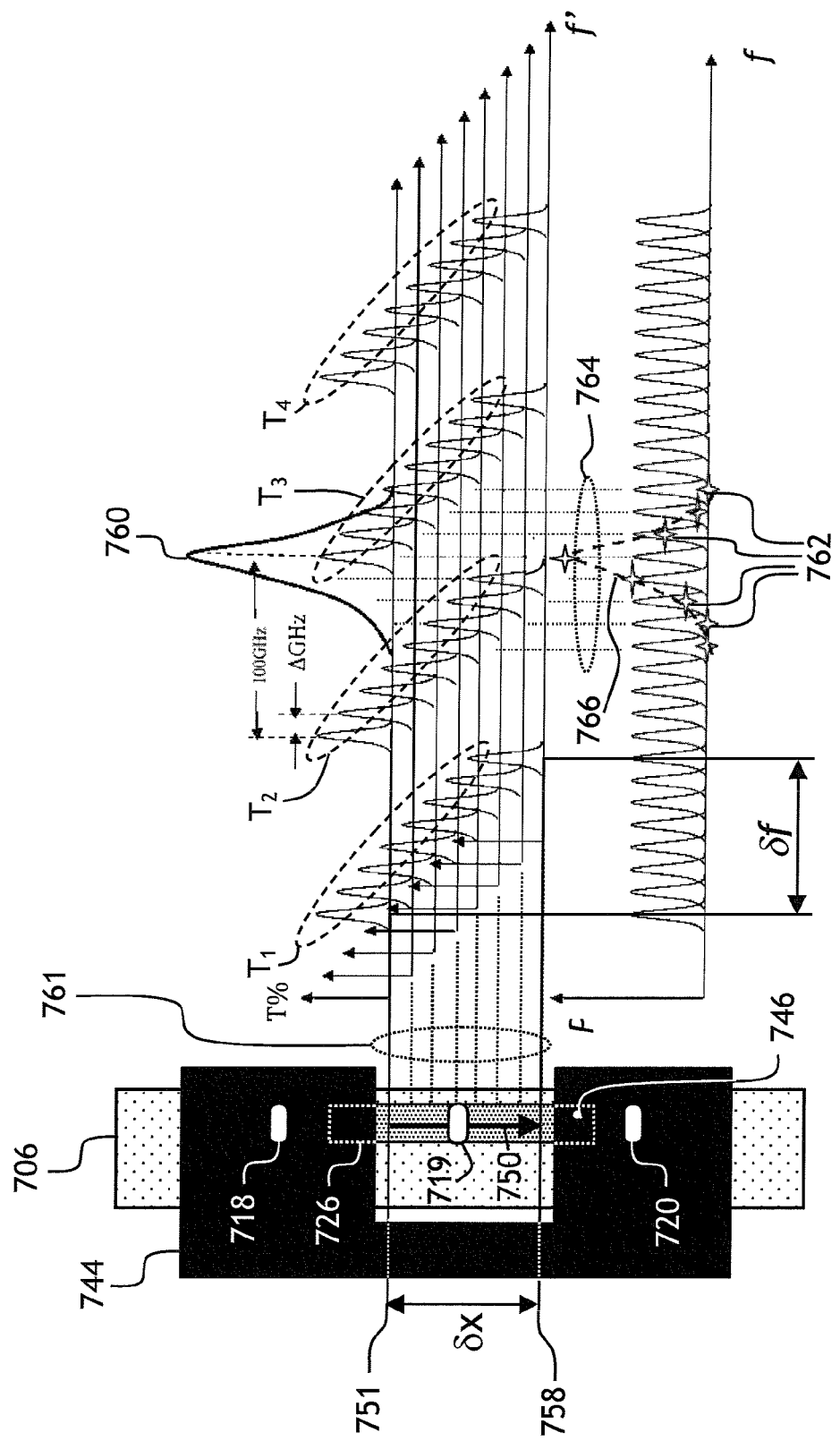
FIG. 7 depicts a front view of a mask and an input slab and a set of transmission functions of individual measurement channels, wherein the transmission functions are correlated to a final measured spectrum.

Turning now to FIG. 7, a front view of a mask 744 and of an input slab 726 is shown, wherein a position of a focused light spot 719 at front facet 746 of input slab 726 supported by a substrate 706 is correlated to an optical frequency shift of four transmission functions $T_1 \ldots T_4$ of four individual measurement channels, not shown. In context of FIG. 7, the term "measurement channel" means an output waveguide of an AWG demultiplexor, e.g. of AWG demultiplexor 424 of FIG. 4, coupled to a respective photodiode for measurement of optical power in that channel. When a light spot 719 of a light having a frequency spectrum represented by a profile 760 is scanned in a direction shown by an arrow 750 from a position 751 to a position 758 on input facet 746 of input slab 726, the optical frequencies corresponding to a peak transmission in transmission functions $T_1 \ldots T_4$, separated by 100 GHz in this example, are continuously shifted to the right in FIG. 7. The correlation between a position of spot 719 and a respective shifted transmission function is symbolically illustrated with horizontal dotted lines 761. As spot 719 shifts by a value δx, the peak optical frequencies in transmission functions $T_1 \ldots T_4$ shift by a value δf. The values of optical power represented by stars 762 detected in measurement channels corresponding to the transmission functions $T_1 \ldots T_4$ are added together as shown symbolically with vertical dotted lines 764 to form a measured spectrum 766. Two other focused light spots 718 and 720, originating from a different input waveguides, are blocked by mask 744 during scanning of spot 719.

What is claimed is:

1. A spectrometer for measuring a spectrum of light having a frequency range Δf, the spectrometer comprising:
    M input ports $P_m$ for receiving the light and relaying it to M source points $S_m$, wherein M≧1; and m is an integer number satisfying the following condition: $1 \leq m \leq M$;
    an input scanning means coupled to the M input ports $P_m$, for relaying the light from any of the M source points $S_m$ to an intermediate point, wherein in operation, a location x of the intermediate point is scanned by the scanning means from a value $x_1$ continuously to a value $x_2$ within a scanning range $\delta x = |x_2 - x_1|$;
    a dispersing means coupled to the input scanning means, for spatially separating frequency components of the light in dependence upon the location x of the intermediate point of the light;
    N detectors $D_n$ coupled to the dispersing means, for detecting the light in dependence upon the optical frequency thereof, wherein N≧2; n is an integer number satisfying the following condition: $2 \leq n \leq N$; and each detector $D_n$ is disposed to receive the optical frequency component at a central frequency $f_n(x)$, so that, when x is scanned between values $x_2$ and $x_1$, the central frequency $f_n(x)$ is scanned within a range $\delta f = |f_n(x_2) - f_n(x_1)|$;
    wherein, for any central frequency $f_0$ within the range Δf of optical frequencies, there is at least one such $n = n_0$ and at least one such $x = x_0$ that $f_{n0}(x_0) = f_0$.

2. A spectrometer of claim 1 wherein δf is substantially equal to Δf/N.

3. A spectrometer of claim 1 wherein δf>Δf/N and wherein for each detector $D_n$ there is an associated spectral band $B_n$ limited by the respective central frequencies $f_n(x_2)$ and $f_n(x_1)$, and each said spectral band $B_n$ overlaps with another said spectral band $B_i$, wherein $|i - n| = 1$.

4. A spectrometer of claim 1, further comprising a controller, for controlling the scanning means and for collecting signals from the N detectors $D_n$ during the scanning of the scanning means within the scanning range $\delta x = |x_2 - x_1|$, and for combining said signals within respective frequency ranges $\delta f = |f_n(x_2) - f_n(x_1)|$, so as to obtain the spectrum of the light within the frequency range Δf.

5. A spectrometer of claim 1, wherein the input scanning means includes a micro-electro-mechanical (MEMS) tiltable mirror.

6. A spectrometer of claim 5, wherein, for every m corresponding to a source point $S_m$, said scanning of the location x of the intermediate point from a value $x_1$ to a value $x_2$ is performed by tilting the MEMS mirror from an angle $\alpha_{m1}$ to an angle $\alpha_{m2}$.

7. A spectrometer of claim 6, wherein:
    M≧2; and
    for an integer number k corresponding to a source point $S_k$, wherein $1 \leq k \leq M$, and wherein k≠m, said scanning of the location x of the intermediate point from a value $x_1$ to a value $x_2$ is performed by tilting the MEMS mirror from an angle $\alpha_{k1}$ to an angle $\alpha_{k2}$, wherein the following conditions are fulfilled: $|\alpha_{m1}-\alpha_{m2}|<|\alpha_{m1}-\alpha_{k1}|$; $|\alpha_{k1}-\alpha_{k2}|<|\alpha_{m1}-\alpha_{k1}|$; $|\alpha_{m1}-\alpha_{m2}|<|\alpha_{m2}-\alpha_{k2}|$; and $|\alpha_{k1}-\alpha_{k2}|<|\alpha_{m2}-\alpha_{k2}|$.

8. A spectrometer of claim 1, wherein the dispersing means includes a diffraction grating.

9. A spectrometer of claim 8, wherein the diffraction grating is a concave diffraction grating.

10. A spectrometer of claim 8, wherein the diffraction grating is flat, and the dispersing means further includes at least one element having optical power, for coupling the light from the input scanning means to the flat diffraction grating, and from the flat diffraction grating to each of the N detectors.

11. A spectrometer of claim 1, wherein the dispersing means includes an arrayed waveguide grating (AWG) comprising:
   an input slab coupled to the input scanning means, wherein said coupling is realized through free space propagation of the light;
   an array of grating waveguides coupled to the input slab;
   an output slab coupled to the array of the grating waveguides; and
   a star coupler coupled to the output slab, wherein the star coupler has N output waveguides, wherein each of said output waveguides is coupled to one of the N detectors.

12. A spectrometer of claim 11, wherein the AWG is a part of a planar lightwave circuit (PLC) and the M input ports $P_m$ are input waveguides of said PLC.

13. A spectrometer of claim 12, wherein the PLC has an input facet, and the input waveguides are fanned in at the input facet to a distance of between 20 and 40 microns, and the M source points $S_m$ are ends of the fanned-in input waveguides, wherein said ends are located at the input facet, and wherein the input facet runs through the input slab from $x_1$ to $x_2$.

14. A spectrometer of claim 13, further comprising a mask abutting the input slab, wherein the mask is opaque to the light having the frequency range $\Delta f$, and wherein the mask has an opening extending from $x_1$ to $x_2$.

15. A spectrometer of claim 11, further comprising a temperature sensor, for compensating a temperature drift of the AWG.

16. An optical performance monitor comprising a spectrometer of claim 1, for measuring optical power, or central wavelength, or optical signal-to-noise ratio of optical signals in a fiberoptic network, wherein the value of $\delta f$ is selected from a group of values consisting of 200 GHz; 100 GHz; 50 GHz; and 25 GHz.

17. A method of measuring a spectrum of light having a frequency range $\Delta f$, the method comprising:
   receiving the light at any of M source points $S_m$, wherein $M \geq 1$; and m is an integer number satisfying the following condition: $1 \leq m \leq M$;
   relaying the light from any of the M source points $S_m$ to an intermediate point at a location x;
   scanning the location x of the intermediate point from a location $x_1$ continuously to a location $x_2$ within a scanning range $\delta x = |x_2 - x_1|$;
   spatially separating frequency components of the light in dependence upon the location x of the intermediate point of the light;
   detecting the frequency components of the light using N detectors $D_n$, wherein $N \geq 2$; n is an integer number satisfying the following condition: $2 \leq n \leq N$; wherein each detector $D_n$ is disposed to receive the optical frequency component at a central frequency $f_n(x)$, so that, when x is scanned between values $x_2$ and $x_1$, the central frequency $f_n(x)$ is scanned within a range $\delta f = |f_n(x_2) - f_n(x_1)|$;
   wherein, for any central frequency $f_0$ within the range $\Delta f$ of frequencies of the light, there is at least one such $n = n_0$ and at least one such $x = x_0$ that $f_{n0}(x_0) = f_0$; and
   collecting signals from the N detectors $D_n$ during the scanning of the scanning means within the scanning range $\delta x = |x_2 - x_1|$, and combining said signals within respective frequency ranges $\delta = |f_n(x_2) - f_n(x_1)|$, so as to obtain the spectrum of the light within the frequency range $\Delta f$.

18. A method of claim 17 wherein $\delta f$ is substantially equal to $\Delta f / N$.

19. A method of claim 17 wherein $\delta f \geq \Delta f / N$ and wherein for each detector $D_n$ there is an associated spectral band $B_n$ limited by the respective central frequencies $f_n(x_2)$ and $f_n(x_1)$, and each said spectral band $B_n$ overlaps with another said spectral band $B_i$, wherein $|i - n| = 1$.

20. A method of claim 17, wherein the scanning is performed using a micro-electro-mechanical (MEMS) tiltable mirror.

21. A method of claim 17, wherein the separating of the frequency components is performed using a diffraction grating.

22. A method of claim 17, wherein separating the frequency components is performed using a planar arrayed waveguide grating (AWG) comprising an input slab having a continuous light entrance region, and wherein the MEMS tiltable mirror is used to scan the intermediate point along the light entrance region.

23. A method of claim 17, wherein the spectrum of the light is a spectrum of optical signals in a fiberoptic network.

24. A method of claim 23, further comprising a step of analyzing the measured spectrum of the light to obtain optical power, or central wavelength, or optical signal-to-noise ratio of optical signals in the fiberoptic network.

* * * * *